United States Patent [19]

Cacas

[11] Patent Number: 5,659,135
[45] Date of Patent: Aug. 19, 1997

[54] METHOD FOR MODELING A STRATIFIED AND FRACTURED GEOLOGIC ENVIRONMENT

[75] Inventor: Marie-Christine Cacas, Nanterre, France

[73] Assignee: Institut Francais du Petrole, Rueil Malmaison, France

[21] Appl. No.: 630,477

[22] Filed: Apr. 10, 1996

[30] Foreign Application Priority Data

Apr. 12, 1995 [FR] France .................. 95/04497

[51] Int. Cl.$^6$ .............. G01V 1/16; G01V 1/00; G09B 23/40
[52] U.S. Cl. .............. 73/152.02; 73/152.52; 73/152.46; 73/152.54; 324/324; 166/250.1
[58] Field of Search .................. 73/152.42, 151, 73/152.51, 152.29, 152.55, 152.18, 152.02, 152.54, 152.52, 152.46; 324/324; 166/250

[56] References Cited

U.S. PATENT DOCUMENTS

| | | | |
|---|---|---|---|
| 4,370,886 | 2/1983 | Smith, Jr. et al. | 73/153 |
| 4,429,581 | 2/1984 | Furmaga | 73/861.04 |
| 4,433,573 | 2/1984 | Hulin | 73/155 |
| 4,727,489 | 2/1988 | Frazier et al. | 364/422 |
| 4,739,655 | 4/1988 | Greer et al. | 73/155 |
| 4,782,695 | 11/1988 | Glotin et al. | 73/155 |
| 4,836,017 | 6/1989 | Bozek | 73/155 |
| 4,860,581 | 8/1989 | Zimmerman et al. | 73/155 |
| 5,299,128 | 3/1994 | Antoine et al. | 364/422 |
| 5,329,811 | 7/1994 | Schultz et al. | 73/155 |
| 5,473,939 | 12/1995 | Leder et al. | 73/155 |

FOREIGN PATENT DOCUMENTS

| | | |
|---|---|---|
| 0 106 05804 | 4/1984 | European Pat. Off. . |
| 0 254 325 | 1/1988 | European Pat. Off. . |
| 2 234 589 | 2/1991 | United Kingdom . |

OTHER PUBLICATIONS

Oil and Gas Journal, vol. 89, No. 44, Nov. 4, 1991, Tulsa, US; pp. 60–65, Roger N. Anderson, et al "Data Cube Depicting Fluid Flow History in Gulf Coast Sediments".

Oil and Gas Journal, vol. 91, No. 26, Jun. 28, 1993, Tulsa, US; pp. 75–80; Hannes E. Leetaru "3D Model Identifies Unswept Oil in Illinois's King Field".

*Primary Examiner*—Hezron E. Williams
*Assistant Examiner*—J. David Wiggins
*Attorney, Agent, or Firm*—Antonelli, Terry, Stout & Kraus, LLP

[57] ABSTRACT

An improved method for modeling a stratified and fractured geological environment is disclosed. The method produces a geometric model of a multi-layered fractured sedimentary medium by performing the steps of obtaining from the medium data relating to fracturation densities n(i) per unit of length in different layers of the medium and interruption densities s(i/j) of fractures in each layer (i) interrupting at interfaces with adjacent layers (j); forming a stratified model having a plurality of strata S(i) with fractures represented as traces across each stratum; and positioning each trace with a determined fractural extension by randomly selecting the measured fracturation densities n(i) and interruption densities s(i/j).

10 Claims, 4 Drawing Sheets

METHOD FOR MODELING A STRATIFIED AND FRACTURED GEOLOGIC ENVIRONMENT

BACKGROUND OF THE INVENTION

1. Field of the Invention

The invention relates to a method for modeling a stratified and fractured geologic environment in order to predict better the fluid flows likely to occur through this environment.

The method according to the invention is notably suitable for the study of the hydraulic properties of fractured formations and notably the study of hydrocarbon displacements in subsurface reservoirs whose structure has been modeled.

2. Description of the Prior Art

It is convenient to use a representation of a fractured rock as a starting point to study the way fluids move therein. A fractured rock is usually translated into a geometric model in which a set of well-defined geometric objects is placed in a conventional representation. These objects, that are for example fractures, i.e. surfaces of breakage of the rock, can be schematized for example by disks, ellipses or any other geometric surface. In this approach, the geometric model is of the stochastic and discrete type. It is discrete because each fracture is represented individually therein by a geometric element. It is stochastic because the aim is not to represent a well-defined real fractured block of rock, with all the fractures that can be directly observed in the field. With this type of stochastic model, a block of rock is represented by a synthetic block reproducing certain statistical properties of the real environment. In the synthetic block, the dimensions and/or the orientations of the fractures follow the same statistical laws as those of a real block.

After the model of the environment has at first been selected, the flow of fluids is calculated by applying the laws of physics. The results of this calculation thus constitute a more or less precise approximation of the flow behaviour of these fluids in a real environment.

It is obvious that the validity of the predictions achieved by means of this combined modeling is highly dependent on the quality of the geometric model selected, i.e. the resemblance between the model and the real environment represented thereby.

Geologic observations of stratified environments show that they are often damaged by fractures in a direction quasi-perpendicular to the stratification planes or interface planes (FIG. 1), and whose ends stop at these planes. These are "diaclases", which are fractures of the rock without relative displacement of the faces of the fracture plane. A diaclase family occurs in the form of quasi-parallel and evenly spaced fracture planes. A given rock can have several diaclase families that intersect and form a network. Such diaclases also have certain geometric properties that have to be taken into account in a petroleum context:

a) In a given material, it has been observed that the density of diaclases in each stratum is proportional to the thickness thereof. This property is true among other things for a material whose strata have variable thicknesses. Thin strata are characterized by a high density of diaclases; they form therefore a most suitable passageway for fluid flows. As for the layers, they have a lower density of diaclases and they consequently are an obstacle to fluid flows.

b) Interfaces between strata are more or less a considerable obstacle to the extension of diaclases. Inter-strata surfaces where the diaclases stop systematically and, conversely, others which for the most part are crossed thereby can be observed. These observations show that the displacement possibilities of the fluids through these interfaces are highly dependent on the nature thereof. An interface that does not stop the progress of diaclases does not hinder a flow. In the opposite case, it will stop fluid flow.

There are well-known discrete stochastic type geometric models that are directed towards the representation of homogeneous environments. They are obtained by a method in which the magnitudes that define them are selected by lot, while complying with the statistical properties of the modeled environment. The geometric objects to be positioned in the model are for example disks. The conventional technique consists for example in:

selecting by lot the number of disks to be positioned;

selecting by lot the position of these disks in the space of the model; and selecting by lot the orientation and the radius of each disk.

This approach is well-suited to homogeneous environments but it is difficult to transpose to the stratified environments representing the structure of the geometry of fracture networks.

SUMMARY OF THE INVENTION

The method according to the invention provides a geometric model of a stratified and fractured sedimentary environment which is a better and more realistic simulation of the fluid flows that are likely to occur therein than those obtained with existing models.

The method comprises modeling the environment by means of interfaces having a substantially common orientation representing the stacking of the strata, and representing fractures in the form of traces each crossing at least one of the strata (these strata being surface portions such as quadrilaterals in a volume representation and would be line portions in a plane representation), each fracture being positioned and its extension limited randomly by complying with fracturation densities per unit of length of each stratum, as well as proportions of traces crossing the interfaces, these densities and proportions being determined by examining the environment.

The method comprises for example selecting for each of the traces an initiation position in a stratum, positioning this trace from this initiation position and determining its possible extension to the adjacent traces, the positioning of the trace being selected randomly by complying with initiation probabilities and probabilities of extension to the adjacent traces defined in reference to the modeled environment.

The method according to the invention not only allows compliance with the average density of the real network, the effective orientations and sizes of the fractures, but also:

it takes into account the variation of the fracturation densities as a function of the thickness of the strata, and provides compliance with the proportion observable in the field between fractures crossing the interfaces and fractures stopping at these interfaces.

BRIEF DESCRIPTION OF THE DRAWINGS

Other features and advantages of the method according to the invention will be clear from reading the description hereafter, given by way of non limitative examples, with reference to the accompanying drawings in which.

DESCRIPTION OF THE PREFERRED EMBODIMENTS

Figure 1:
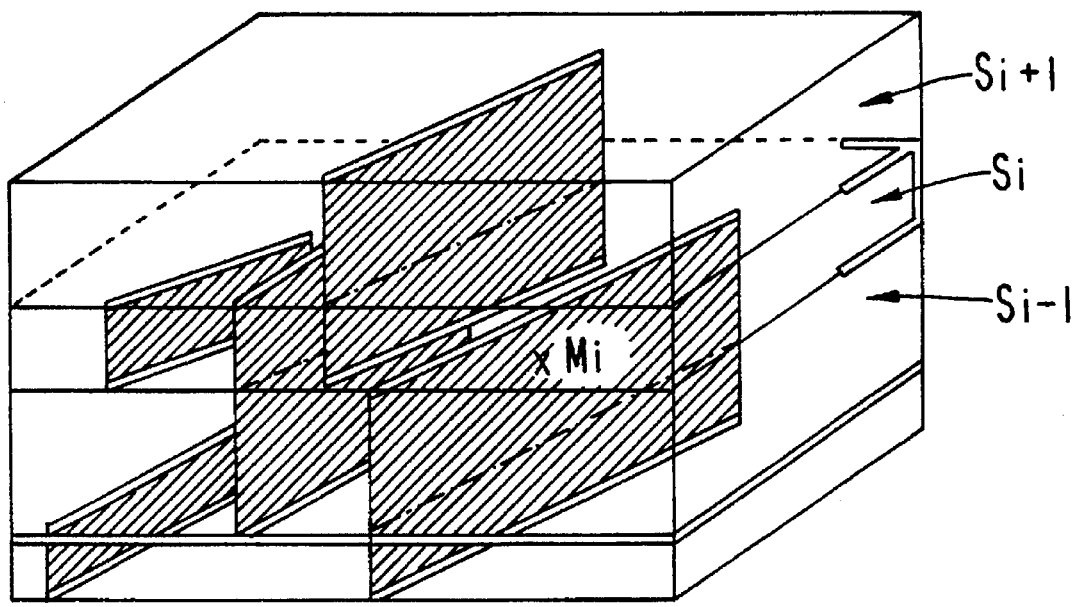
FIG. 1 shows a modeling of a stratified environment where the fractures are represented by oblique surface portions.
Figure 2A:
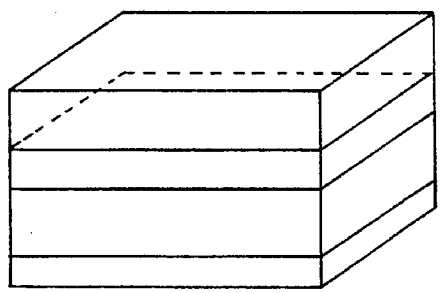
FIGS. 2a to 2f show different stages of the modeling process according to the invention.

In order to achieve a three-dimensional representation of a stratified and fractured sedimentary structure, a model consisting of a superposition of Ns strata is for example used (FIG. 2A), the interfaces between the strata being represented by planes. In this model, the fractures are represented by surface portions non parallel to the interfaces (such as quadrilaterals for example) that stop when they meet two particular interfaces of the model. The different surface portions are defined one by one according to the process sequence defined hereafter.

Figure 2B:
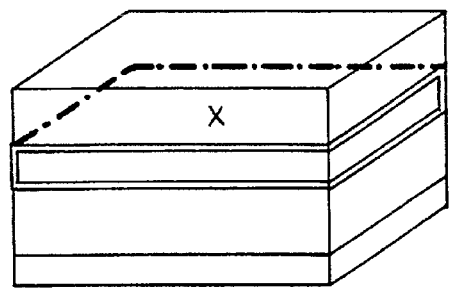
Figure 2C:
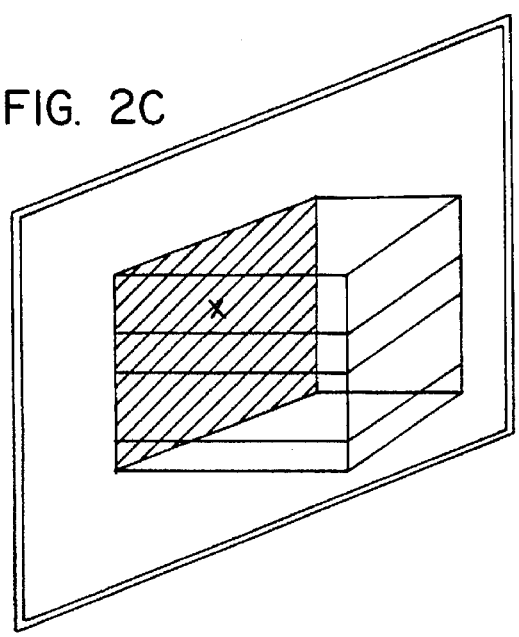
Figure 2D:
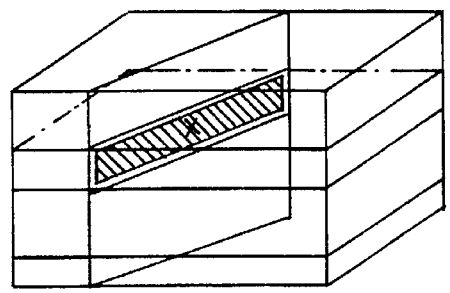
Figure 2E:
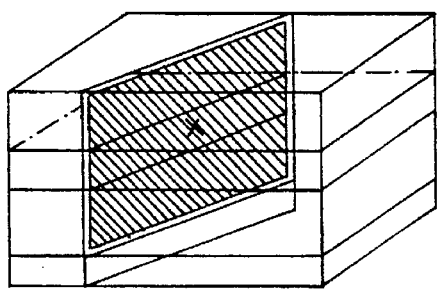
Figure 2F:
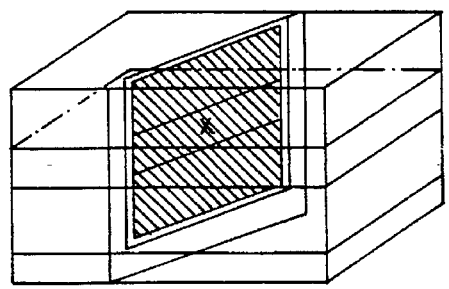

1) A stratum Si called "initiation stratum" is selected randomly from the Ns strata and the probability of selecting this stratum of rank i is referred to as pInit(i).
2) A point or "grain" Mi is selected at random in stratum Si (FIG. 2B).
3) A surface portion, non parallel to the strata passing through this grain, is placed in the model with a given orientation that can be selected randomly for example (FIG. 2c). This surface portion is limited in height by the upper and lower interfaces of the initiation stratum but it is not limited in width (FIG. 2D).
4) The possible extension in height of this surface portion to the interfaces of the adjacent strata Si−1 and Si+1 is selected randomly. The probabilities that the surface portion will spread towards the stratum S−1 and S+1 are respectively referred to as p(i,i−1) and p(i,i+1).
5) The previous operation is reiterated in order to know if the progress of the surface portion continues towards strata Si−2 and Si+2, then Si−3 and Si+3, etc, until interfaces that interrupt the stretching of the fracture are reached (FIG. 2E).
6) Finally, the surface portion representing the fracture is "cut" at a given length 1, possibly obtained randomly, while remaining centered on the initial point or grain (FIG. 2F).

The positioning and the extension of each surface portion randomly are governed by two types of parameters:

the probabilities pInit(i) of initiation in stratum Si, and the probabilities p(i,i−1) and p(i,i+1) of extension of the fractures of a stratum Si to the adjacent strata (Si−1) and (Si+1).

The value of these parameters closely depends on the configuration of the stratified and fractured environment to be modeled.

Figure 3:
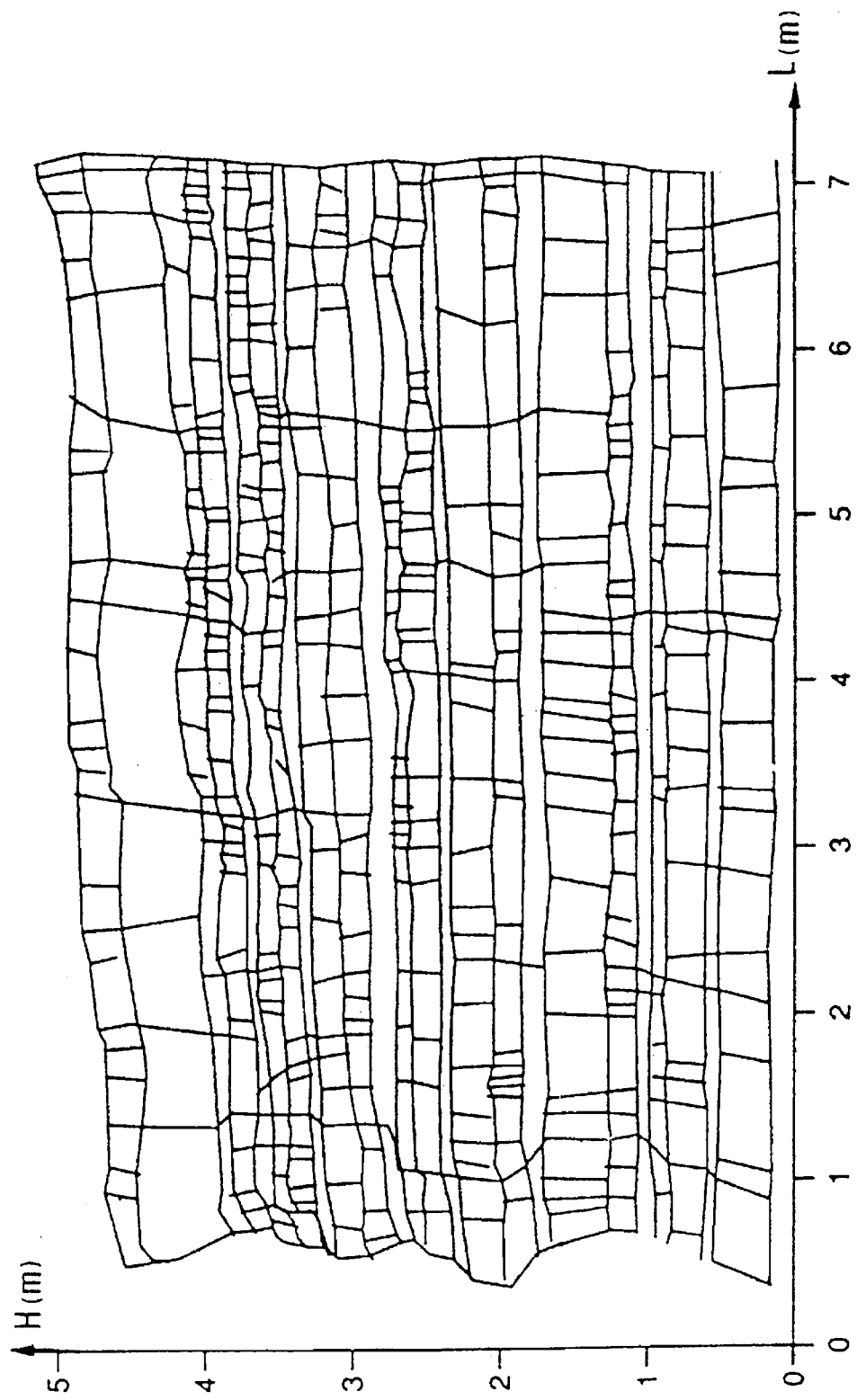
FIG. 3 shows a digitized image of a stratified and fractured natural environment whose analysis allows determination of the values of the fracturation densities of the strata and their propagation through the interfaces between the strata.
Figure 4:
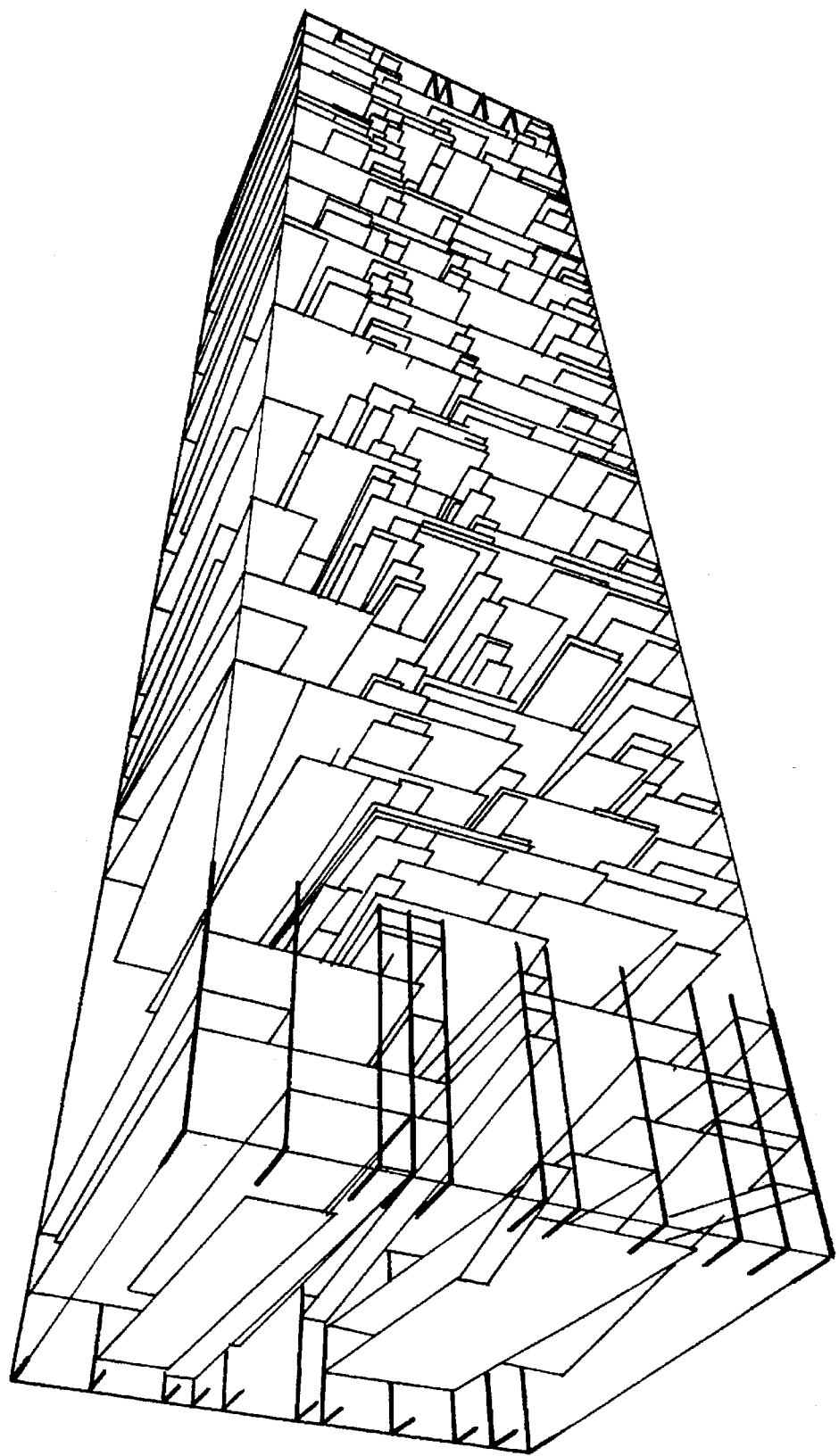
FIG. 4 shows an example of a reservoir model allowing an accurate simulation of the flows through the modeled reservoir.

A preliminary study of the environment by means of digitized maps or photos, such as that shown in FIG. 3 for example, allows determination as follows:

the fracturation densities n(i) in the different strata, i.e. the average number n(i) of fractures found per unit of length in the plane of stratum Si, and effective conditions of interruption of the fractures at the interfaces. For each stratum, the interruption conditions are expressed by two values s(i/i+1) and s(i/i−1), the first one representing the number of fractures, found per unit of length in the stratification plane, that stop at the interface between strata Si and Si+1, and the second the corresponding number of fractures that stop at the interface between strata Si and Si−1. The quantities (i+1) and (i−1) are an identification of adjacent strata which are more generally represented by the variable j so the interruption conditions between two strata are generally represented by s(i/j).

Adjustment of parameters pInit(i), p(i,i−1) and p(i,i+1) from the real conditions and densities recorded is achieved in two stages.

Probability values p(i,i−1) and p(i,i+1) that meet the interruption conditions at the interfaces are sought at first, then the values pInit(i) to be used to meet the imposed density conditions are deduced therefrom.

a) It can be shown that the probability p(i−1,i) of extension of a fracture through the interface between strata Si−1 and Si can be expressed in the form:

$$p(i-1,i) = \frac{s(i/i+1) + n(i) \cdot [p(i/i-1) - 1]}{s(i/i+1) + [n(i) + s(i/i-1) \cdot [p(i,i-1) - 1]]} \quad (1)$$

For each interface plane, one selects values p(i,i−1) and p(i−1,i) ranging between 0 and 1 and such that relation (1) is verified in order to comply with the interruption conditions at the interfaces. b) The initiation conditions pInit(i) also have to verify the equation 2 as follows:

$$n(i) = N \cdot \left\{ \sum_{k=1}^{i-1} \left[ pInit(k) \cdot \prod_{l=k}^{i-1} p(i-1,i) \right] + pInit(i) + \sum_{k=i+1}^{n} \left[ pInit(k) \cdot \prod_{l=k}^{i+1} p(i,i-1) \right] \right\} \quad (2)$$

In this relation, $$N = \sum_{i=1}^{Ns} n(i),$$

and Ns is the number of strata of the model.

Once the probabilities p(i,i−1) and p(i,i+1) obtained, the initiation probabilities pInit(i) in the different strata can be respectively determined, which are solutions to the linear system of equations above. The imposed fracturation densities resulting from preliminary observations are respected by adopting the values obtained.

Particular case: One can make it a rule to propagate the surface portions in only one direction, from the lower strata to the upper strata for example.

$p(i,i-1)=0$ and $p(i,i+1)=n(i+1)-s(i+1/i)$ are selected then.

The initiation probabilities pInit(i) are then calculated explicitly by means of the relations:

$$pInit(i) = \frac{n(i)}{N} - \sum_{k=l}^{i-1} \left[ pInit(k) \cdot \prod_{l=k}^{i-1} p(l,l+1) \right]$$

I claim:

1. A method for producing a geometrical model of a multi-layered fractured sedimentary medium comprising:

obtaining from the medium data relating to fracturation densities n(i) per unit of length in different layers of the medium and interruption densities s(i/j) of fractures in each layer (i) interrupted at interfaces with adjacent layers (j);

forming a stratified model having a plurality of strata S(i) representing each layer (i) with the fractures being represented as traces across each stratum; and positioning each trace with a determined fractural extension by randomly selecting the measured fracturation densities n(i) and interruption densities s(i/j) of the layers i and j.

2. A method as recited in claim 1 wherein:

the stratified model has a volume and each trace is a portion of a plane positioned in the stratified model of the volume.

3. A method as recited in claim 2, comprising:

determining, from the data, initiation probabilities pInit(i) and extension probabilities (p(i,i−1), p(i,i+1) extending towards spatially adjacent strata (Si−1, Si+1), selecting for each of the traces an initiation position in a stratum (Si), initiating a trace at the initiation position by randomly selecting the initiation probabilities for the trace in the stratum and the extension probabilities through the interfaces of the stratum (Si) for positioning the trace in the stratified model.

4. A method as recited in claim 3, wherein:

the extension probabilities p(i,i−1) to adjacent stratum (Si−1) of the traces is determined by:

$$P(i-1,i) = \frac{s(i/i+1) + n(i)[p(i/i-1)-1]}{s(i/i+1) + [n(i) + s(i/i-1)[p(i,i-1)-1]]}$$

wherein (i+1) and (i−1) identify particular stratum of the adjacent layers (j).

5. A method as recited in claim 3, wherein said initiation positions of the traces are so selected that initiation probabilities (pInit(i)) verify the relationship:

$$n(i) = N \sum_{k=l}^{i-1} \left[ pInit(k) \prod_{l=k}^{i-1} p(i-1,i) \right] + pInit(i) +$$

-continued $$\sum_{k=i+1}^{n} \left[ pInit(k) \prod_{l=k}^{i+1} p(i,i-1) \right]$$

where $$N = \sum_{i=1}^{Ns} N(i)$$

and Ns is a total number of strata.

6. A method as recited in claim 4, wherein said initiation positions of the traces are so selected that initiation probabilities (pInit(i)) verify the relationships:

$$n(i) = N \sum_{k=l}^{i-1} \left[ pInit(k) \prod_{l=k}^{i-1} p(i-1,i) \right] + pInit(i) +$$

$$\sum_{k=i+1}^{n} \left[ pInit(k) \prod_{l=k}^{i+1} p(i,i-1) \right]$$

where $$N = \sum_{i=1}^{Ns} n(i)$$

and Ns is a total number of strata.

7. A method as recited in claim 3 further comprising:

limiting a length of each portion of the plane in a direction parallel with a direction of extension of the stratum.

8. A method as recited in claim 4 further comprising:

limiting a length of each portion of the plane in a direction parallel with a direction of extension of the stratum.

9. A method as recited in claim 1 comprising:

obtaining data from the medium by digitally converting one of maps or photographs of the medium.

10. A method as recited in claim 2 comprising:

obtaining data from the medium by digitally converting one of maps or photographs of the medium.

* * * * *